UNITED STATES PATENT OFFICE.

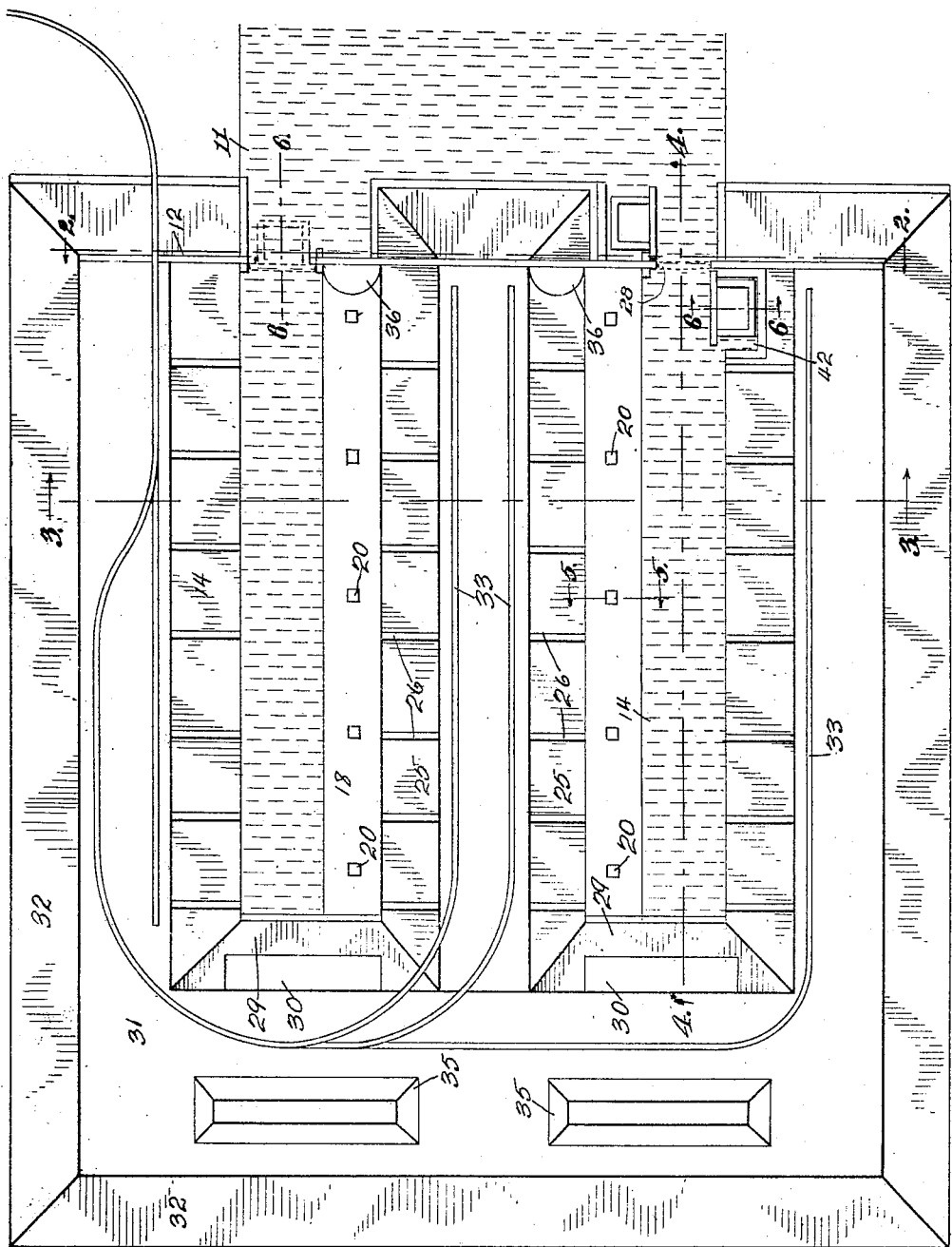

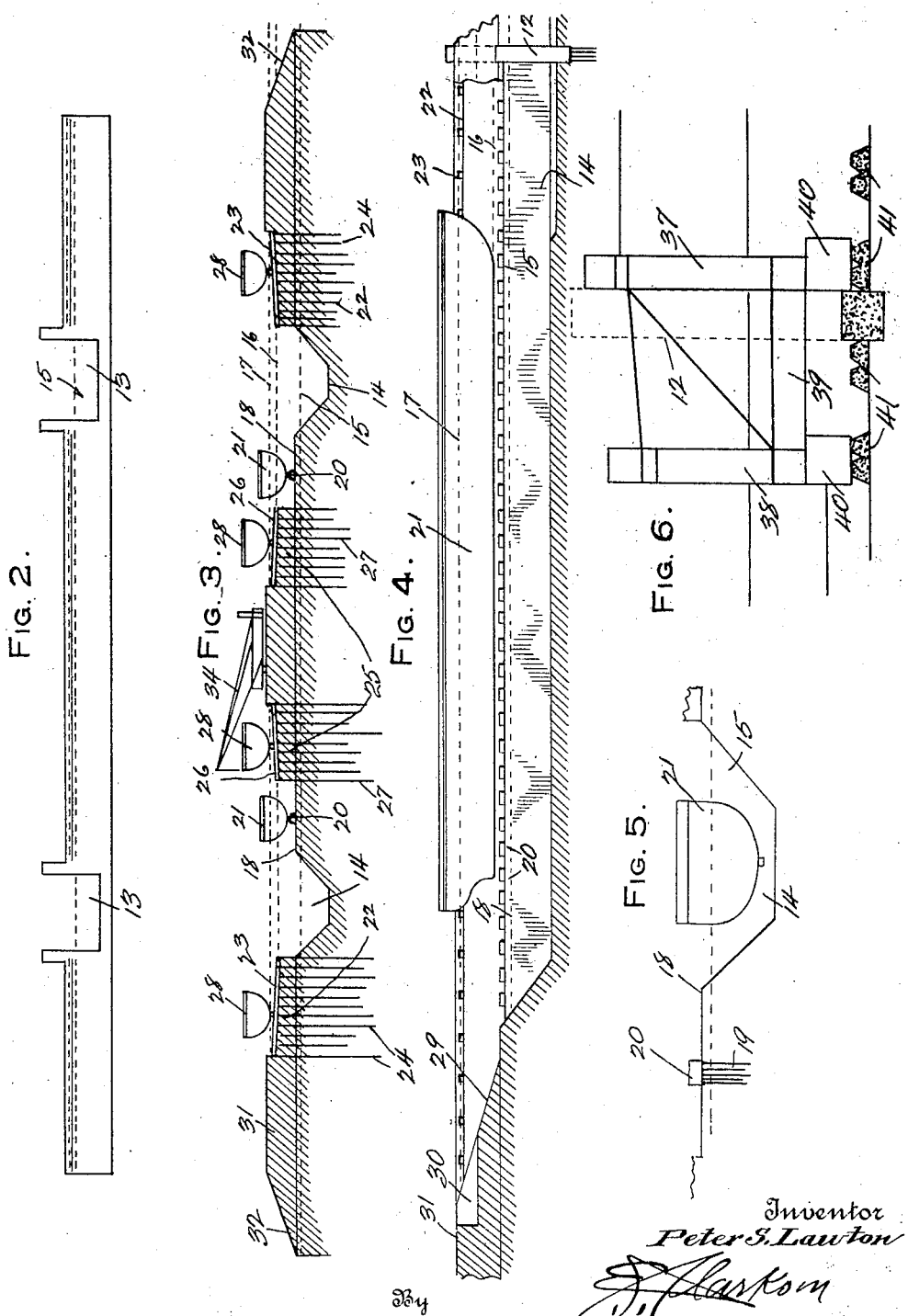

PETER S. LAWTON, OF NEW ORLEANS, LOUISIANA.

DRY-DOCK.

1,376,345.  Specification of Letters Patent.  Patented Apr. 26, 1921.

Application filed February 7, 1919. Serial No. 275,594.

*To all whom it may concern:*

Be it known that PETER S. LAWTON, a citizen of the United States of America, residing at New Orleans, in the parish of Orleans and State of Louisiana, has invented certain new and useful Improvements in Dry-Docks, of which the following is a specification.

This invention relates to ship construction and repair and has special reference to a ship yard combining construction and launching ways with dry-docking means for repairing or completing ships which have been launched.

One pricipal object of the invention is to improve the arrangement and general construction of ship yards for the purposes specified.

Another important object of the invention is to provide an improved ship yard of the class described wherein great economy in ground space is possible with a maximum capacity for construction and repair.

A third important object of the invention is to provide, an improved arrangement of dry dock for such a yard wherein improved and novel facility is afforded for landing material carried by lighters or other like water borne transport means.

With the above and other objects in view, as will be hereinafter apparent, the invention consists in general of certain novel arrangements of details, and combinations of elements hereinafter fully described, illustrated in the accompanying drawings and specifically claimed.

In the accompanying drawings like characters of reference indicate like parts in the several views, and:—

Figure 1 is a plan of a ship yard constructed in accordance with this invention.

Fig. 2, is a section on the line 2—2 of Fig. 1.

Fig. 3, is a section on the line 3—3 of Fig. 1.

Fig. 4, is a section on the line 4—4 of Fig. 1.

Fig. 5, is an enlarged detail section on the line 5—5 of Fig. 1.

Fig. 6, is an enlarged detail section on the line 6—6 of Fig. 1, but showing the combined gate and miniature floating dry dock for small vessels in position to close one of the dry docks.

In the construction of a ship yard in accordance with this invention a suitable piece of land is selected lying near but not necessarily on a navigable stream, bay or other water of sufficient depth, or which can be channeled to sufficient depth, to accommodate the ships which it is proposed to build and repair in the ship yard; and leading from or connected with this water is a slack water basin 11 excavated to a sufficient depth so that there will be, at all stages of river or tide level, sufficient water to float the ships. Across the inner end of this basin is constructed a concrete wall 12 having one or more suitable gateways 13 formed therein which afford communication between the basin 11 and deep water channels 14 forming the deepest portions of the dry docks, the water in these channels, at low water, rising to the dotted line 15, at mean water level to the dotted line 16 and at high water to the dotted line 17 whenever there is free communication between the river or bay and the dry docks. Just above the low water line the ground is leveled off at one side of each channel 14 as shown at 18 and this leveled portion extends along the full length of each channel as shown. At intervals along the center lines of these leveled portions are driven groups of piles 19 which support keel blocks 20. By this construction a ship, such as is shown at 21 in Fig. 4, may be floated into one of the dry dock channels and the gateway 13 leading thereto may be closed by a suitable gate (such as will be described later). Water may then be pumped in to raise the water to the high water line 17 and the ship may be floated sidewise above the keel blocks, being allowed to settle thereon by permitting the water level to drop as by opening suitable valves, which are not shown as they are common to dry docks). Of course, if the river or tide be high, it may be necessary to pump the water out to free the working surface 18 from water.

At the side of each channel opposite the surface 18, which may be termed the dry dock proper or the repair platform, the ground surface is elevated and inclined downward toward the channel as at 22 and on this inclined surface are laid launching skids or ways 23 supported on groups of piles 24. Alongside each repair level is a similar elevated and inclined ground surface 25 having launching skids 26 supported on piles 27. Thus, without interferring with the dry dock vessels 28 may be built parallel to each side thereof and, when ready for launching may be launched sidewise into the channel 14, the water level having been raised to the line 17 for that purpose. Of course during the launching it will be necessary to have the repair level free but, owing to the ease of handling a vessel may be readily removed, if undergoing repairs, and replaced after the launching is effected.

From the foregoing it will be seen that each unit in the yard consists essentially in a dry dock having a water channel and a repair platform above the normal low water line of the channel, and building ways parallel to the dry dock and elevated above the working level, these ways being inclined downward toward the dry dock.

The inner end of each dry dock is inclined as at 29 and provided at the top of this inclined portion with a pocket or bay 30 having a horizontal floor so that lighters may be floated in at high water and allowed to rest on the floor of this bay for unloading being thus nearly on a level with the upper ground surface 31 which may form the top of a level having inclined banks 32. On the surface 31 may also be laid tracks 33 which may accommodate an erecting crane 34 and workshops 35 may also be built on this ground level. It is to be understood that suitable pumps are provided for causing the required variations in the water level, such pumps being indicated at 36 in Fig. 1.

The gates before referred to are floating gates and each consists of a longer wall 37 and shorter wall 38 connected by members 39 forming a floor on which small vessels may be docked.

The bottoms of the walls terminate in members 40 adapted to rest on sills 41 formed within and without each gateway. The longer wall is of sufficient length to overlap the sides of the gateway 13 while the remainder of the gate projects through such gateway as shown in dotted lines in Fig. 1. In this position the level of the water within the channel 15 may be raised above the level in the basin 11 while by reversing the gate the water level within the channel may be lowered below that in the basin so that a small boat may be floated into position between the two walls and then allowed to rest on the members 39 as the water level within the channel is lowered.

These gates may be kept in any convenient place in the basin or in a bay or pocket 42 in the side of the channel.

There has thus been provided a compact and efficient ship yard of the kind described and for the purpose specified.

Having thus described the invention, what is claimed as new, is:—

1. In a dry dock having a channel to receive ships by flotation, the combination with a repair platform extending from one side margin of the channel parallel thereto, of building platforms extending parallel to the channel from the remaining side margin of said channel and the inland side of the repair platform respectively.

2. In a dry dock including a channel open at one end to receive ships, said channel normally having water therein of sufficient depth to receive ships, a repair platform extending from one side margin of the channel and lying above the water level of the channel at such time as a ship is on the platform; in combination with building platforms extending parallel to the channel from the remaining side margin thereof and the inland side of the repair platform respectively, said building platforms being synclinally arranged and having side launching ways thereon.

3. In a dry dock including a channel open at one end to receive ships, said channel normally having water therein of sufficient depth to receive ships, and a repair platform extending from one side margin of the channel and lying above the water level of the channel at such time as a ship is on the platform; in combination with building platforms extending parallel to the channel from the remaining side margin thereof and the inland side of the repair platform respectively, said building platforms being synclinally arranged and having side launching ways thereon, and a lighter unloading bay at the inner end of said channel and having its bottom above the normal low water level of the channel.

In testimony whereof I affix my signature.

PETER S. LAWTON.